(12) United States Patent
Wan et al.

(10) Patent No.: US 11,789,314 B2
(45) Date of Patent: Oct. 17, 2023

(54) BACKLIGHT MODULE AND LIQUID CRYSTAL DISPLAY

(71) Applicant: HKC CORPORATION LIMITED, Shenzhen (CN)

(72) Inventors: Ye Wan, Shenzhen (CN); Haoxuan Zheng, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/050,253

(22) Filed: Oct. 27, 2022

(65) Prior Publication Data
US 2023/0135900 A1    May 4, 2023

(30) Foreign Application Priority Data
Nov. 1, 2021   (CN) .......................... 202111281325.8

(51) Int. Cl.
G02F 1/00        (2006.01)
G02F 1/13357     (2006.01)

(52) U.S. Cl.
CPC .. *G02F 1/133608* (2013.01); *G02F 1/133603* (2013.01); *G02F 1/133605* (2013.01)

(58) Field of Classification Search
None
See application file for complete search history.

(56) References Cited

U.S. PATENT DOCUMENTS

| | | | | |
|---|---|---|---|---|
| 5,808,708 A * | 9/1998 | Oyama | ................ | G02B 6/0018 |
| | | | | 362/621 |
| 9,075,175 B2 * | 7/2015 | Tsai | ..................... | G02B 6/0036 |
| 9,805,630 B2 * | 10/2017 | Franklin | .............. | G02B 6/0028 |
| 10,690,837 B2 * | 6/2020 | Liu | ..................... | G02F 1/13318 |
| 11,017,732 B1 * | 5/2021 | Tang | ..................... | G09G 3/3406 |
| 2004/0170373 A1 * | 9/2004 | Kim | ..................... | G02B 6/0028 |
| | | | | 385/901 |

(Continued)

FOREIGN PATENT DOCUMENTS

| | | |
|---|---|---|
| CN | 101435961 | 5/2009 |
| CN | 101738674 | 6/2010 |

(Continued)

OTHER PUBLICATIONS

CNIPA, First Office Action for CN Application No. 202111281325.8, dated Dec. 7, 2021.

(Continued)

*Primary Examiner* — Gerald J Sufleta, II
(74) *Attorney, Agent, or Firm* — Hodgson Russ LLP (57) ABSTRACT

The backlight module includes a backplate, a light guide plate and a light source. The light guide plate includes a body part and a bending part. The body part is located on a side of the backplate facing the display panel, and a surface of the body part facing away from the backplate is an out-light surface. The bending part has a first end face and a second end face. The first end face is connected to the body part, the second end face is located on the side of the backplate facing away from the display panel and is an out-light surface. The light source is located on the side of the backplate facing away from the display panel and opposite to the second end face. The disclosure can achieve a narrower bezel design or bezel-less design.

18 Claims, 4 Drawing Sheets

(56) References Cited

U.S. PATENT DOCUMENTS

| | | | |
|---|---|---|---|
| 2006/0215387 A1 | 9/2006 | Wang et al. | |
| 2006/0256578 A1* | 11/2006 | Yang | G02B 6/0031 |
| | | | 362/609 |
| 2013/0242600 A1* | 9/2013 | Franklin | G06Q 20/3223 |
| | | | 362/602 |
| 2015/0173172 A1* | 6/2015 | Yang | G02F 1/133305 |
| | | | 361/749 |
| 2016/0282550 A1* | 9/2016 | Lee | G02B 6/0088 |
| 2017/0123129 A1* | 5/2017 | Zheng | G02B 6/0043 |
| 2017/0363800 A1* | 12/2017 | Liu | G02B 6/0026 |
| 2018/0033919 A1* | 2/2018 | Lee | H01L 33/58 |
| 2018/0151655 A1* | 5/2018 | Kim | H10K 50/86 |
| 2019/0353959 A1* | 11/2019 | Wu | G02B 6/002 |
| 2020/0096806 A1* | 3/2020 | Reeves | G09F 9/301 |
| 2023/0080052 A1* | 3/2023 | Liang | G02B 6/0028 |
| | | | 362/615 |

FOREIGN PATENT DOCUMENTS

| | | |
|---|---|---|
| CN | 102506396 | 6/2012 |
| CN | 104832885 | 8/2015 |
| CN | 105739189 | 7/2016 |
| CN | 105785638 | 7/2016 |
| CN | 106896557 | 6/2017 |
| CN | 107315272 | 11/2017 |
| CN | 207181740 | 4/2018 |
| CN | 207318886 | 5/2018 |
| CN | 108153070 | 6/2018 |
| CN | 208444115 | 1/2019 |
| CN | 208621875 | 3/2019 |
| CN | 208861114 | 5/2019 |
| CN | 110133920 | 8/2019 |
| CN | 110501848 | 11/2019 |
| JP | 2002297071 | 10/2002 |

OTHER PUBLICATIONS

CNIPA, Second Office Action for CN Application No. 202111281325.8, dated Dec. 31, 2021.

CNIPA, Third Office Action for CN Application No. 202111281325.8, dated Jan. 19, 2022.

CNIPA, Fourth Office Action for CN Application No. 202111281325.8, dated Aug. 2, 2022.

\* cited by examiner

BACKLIGHT MODULE AND LIQUID CRYSTAL DISPLAY

CROSS-REFERENCE TO RELATED APPLICATIONS

This application claims priority to Chinese Patent Application 202111281325.8, filed Nov. 1, 2021, the entire disclosure of which is incorporated herein by reference.

FIELD OF TECHNOLOGY

The disclosure involves to the technical field of display, in particular to a backlight module and a liquid crystal display.

BACKGROUND

At present, Liquid Crystal Display (LCD) often uses edge-lit backlight, whose light guide plate and light source are provided on the same side of the backplane, close to each other, subject to the thickness of the light source and the thickness of the heat sink, the bezel thinning of the LCD will be constrained.

SUMMARY

There are provided a backlight module and a liquid crystal display according to embodiments of the present disclosure.

According to a first aspect of the present disclosure, there is provided a backlight module including:
  a backplate;
  a light guide plate comprising a body part disposed at a side of the backplate facing a display panel, a surface of the body part facing away from the backplate being an out-light surface, and a bending part having a first end face and a second end face arranged in a bending extension direction thereof, the first end face being connected to the body part, the second end face being located on a side of the backplate facing away from the display panel, and the second end face being an in-light surface; and
  the light source is located on the side of the backplate facing away from the display panel and arranged opposite the second end face.

According to a second aspect of the present disclosure, there is provided a liquid crystal display including a display panel and a backlight module including a backplate, a light guide plate and a light source,
  the light guide plate comprises a body part disposed between the backplate and the display panel, a surface of the body part facing the display panel being an out-light surface, and a bending part having a first end face and a second end face arranged in a bending extension direction thereof, the first end face being connected to the body part, the second end face being located on a side of the backplate facing away from the display panel, and the second end face being an in-light surface; and
  the light source is located on the side of the backplate facing away from the display panel and arranged opposite the second end face.

It should be understood that the above general description and the following detailed description are exemplary and explanatory only and are not intended to limit the present disclosure.

BRIEF DESCRIPTION OF THE DRAWINGS

The accompanying drawings which are incorporated in and constitute a part of the description illustrate embodiments consistent with the disclosure and together with the description serve to explain the principles of the disclosure. It will be apparent that the drawings described below are only some embodiments of the present disclosure, and other drawings may be obtained from them without creative effort for those of ordinary skill in the art.

DETAILED DESCRIPTION OF THE EMBODIMENTS

Exemplary embodiments will now be described more comprehensively with reference to the accompanying drawings. However, the exemplary embodiments can be implemented in a variety of forms and should not be construed as being limited to the examples set forth herein. Rather, these embodiments are provided so that the present disclosure will be more comprehensive and complete, and the concept of exemplary embodiments will be fully communicated to those skilled in the art.

In the present disclosure, the terms "first", "second" are used for descriptive purposes only and are not to be construed as indicating or implying relative importance or as implying the number of technical features indicated. Thus, the features defined as "first" or "second" may be explicitly or implicitly defined as including one or more of the features. In the description of the present disclosure, "a plurality of" means two or more, unless explicitly and specifically defined otherwise.

In this disclosure, the terms "assembly", "connection" and the like are understood in a broad sense and may be, for example, a fixed connection, a detachable connection, or as a unit, unless otherwise expressly specified and limited; the connection can be a mechanical connection or an electrical connection; or the connection can be a directly connection or an indirect connection by intermediate media, and it can be the internal communication of two elements or the interaction between two elements. For those ordinarily skilled in the art, the specific meanings of the above terms in the present disclosure will be understood according to the specific circumstances.

Further, the described features, structures or characteristics may be incorporated in any suitable manner in one or more embodiments. In the following description, many specific details are provided to give a full understanding of the embodiments of the present disclosure. However, those skilled in the art will appreciate that one or more of the technical solutions of the present disclosure may be practiced without particular details, or other methods, group elements, devices, steps, etc. may be employed. In other instances, well-known methods, devices, implementations or operations are not shown or described in detail to avoid obscuring aspects of the present disclosure.

An embodiment of the disclosure provides a backlight module, which can be applied to a liquid crystal display. As shown in FIGS. 1 to 4, the backlight module may include a backplate 10, a light guide plate 11 and a light source 12.

Figure 6:
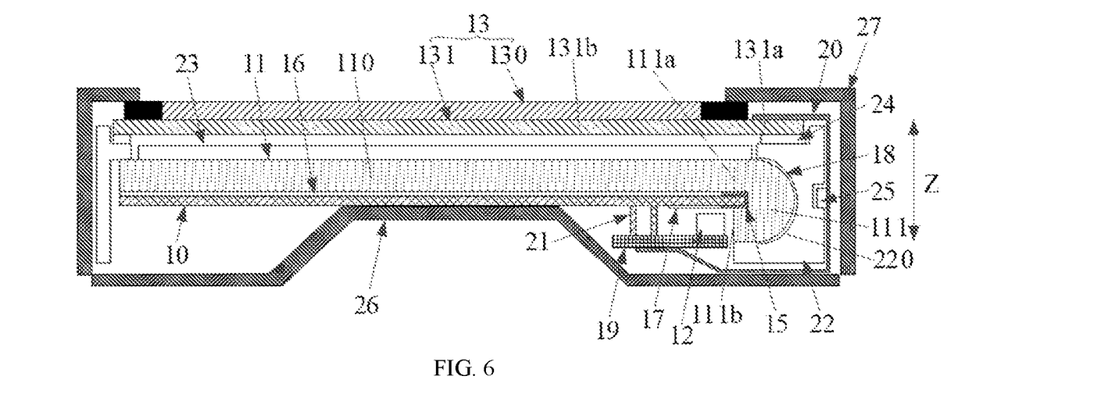
FIG. 6 shows a structural schematic view of the liquid crystal display according to a fourth embodiment of the present disclosure.
Figure 7:
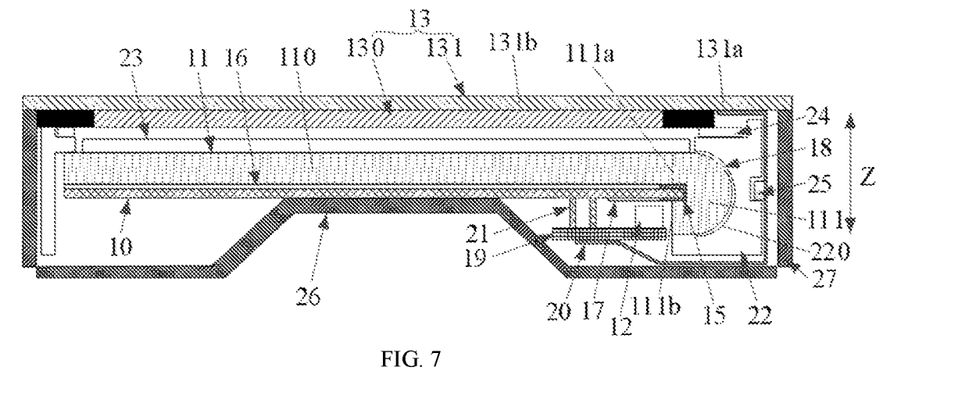
FIG. 7 shows a structural schematic view of the liquid crystal display according to a fifth embodiment of the present disclosure.

The entire backplate 10 may have a plate-like structure. In a thickness direction Z of the backplate 10, the backplate 10 has a front side and a back side. The front side of the backplate 10 refers to the side of the backplate 10 facing the display panel 13, and the back side of the backplate 10 refers to the side of the backplate 10 facing away from the display panel 13, as shown in FIGS. 6 and 7.

Figure 2:
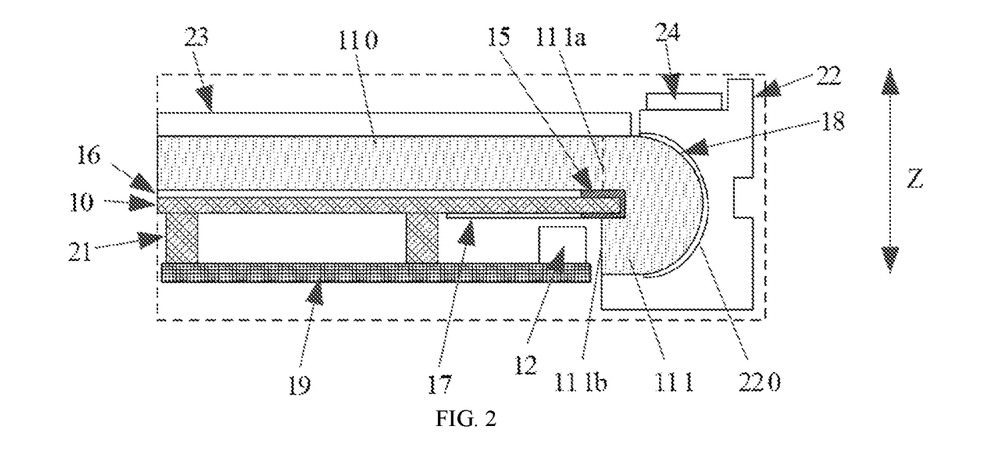
FIG. 2 shows an enlarged schematic view of Part A shown in FIG. 1.

The light guide plate 11 can be bent. In detail, as shown in FIG. 2, the light guide plate 11 may include a body part 110 and a bending part 111. The body part 110 may be located on the front side of the backplate 10, and the bending part 111 has a first end face 111a and a second end face 111b which are provided in a bending extension direction thereof. The first end face 111a of the bending part 111 is connected to the body part 110, and the second end face 111b of the bending part 111 is located on the back side of the backplate 10. The surface of the body part 110 facing away from the backplate 10 is an out-light surface, and the second end face 111b of the bending part 111 is an in-light surface.

The light source 12 may be located on the back side of the backplate 10 and is disposed opposite the second end face 111b (i.e., the in-light surface) of the bending part 111. The light emitted by the light source 12 may enter the bending part 111 through the second end face 111b of the bending part 111, then enter the body part 110 through the first end face 111a of the bending part 111, and then emit to the display panel 13 through the out-light surface of the body part 110. For example, the light source 12 may be an LED (Light Emitting Diode) lamp.

According to the present disclosure, the light guide plate 11 can be arranged in a bent-shaped structure. The in-light surface of the light guide plate 11 is bent to the back side of the backplate 10 so that the light source 12 can be arranged on the back side of the backplate 10. Compared with the solution of the side-lit backlight liquid crystal display shown in FIG. 5, specifically, in the liquid crystal display shown in FIG. 5, the overall light guide plate 11 has a plate-like structure, and the light guide plate 11, the light source 12 and the heat sink 14 for heat dissipation of the light source 12 are located on the same side of the backplate 10, that is, on the side of the backplate 10 facing the display panel 13, and the backplate 10 may have a folding part 112 folded upward (i.e., in a direction where the light guide plate 11 is located) to restrict the movement of the light source 12. The present disclosure can avoid the restriction of the thickness of the light source 12, the thickness of the heat sink 14 and the thickness of the folding part 112 of the backplate 10 on the bezel design, so that a narrower bezel or no bezel can be achieved.

In addition, by arranging the light source 12 and the in-light surfaces of the light guide plate 11 on the back side of the backplate 10, while achieving the narrower bezel or no bezel, the space on the back side of the backplate is relatively large, it is beneficial for the light source 12 to dissipate heat, thereby saving adopting the heat dissipation structure and reducing the cost, also the spacing between the light source 12 and the in-light surface of the light guide plate 11 can be appropriately increased, thereby avoiding the damage to the light source 12 when the light guide plate 11 is heated and expanded, and prolonging the service life of the product.

The configuration of the backlight module of different embodiments of the present disclosure will be described in detail below with reference to the accompanying drawings.

Embodiment 1

Figure 1:
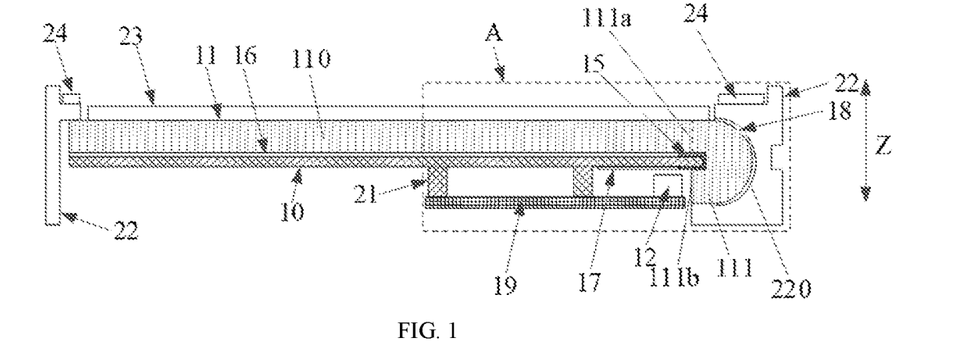
FIG. 1 shows a structural schematic view of a backlight module and a printed circuit board assembled according to a first embodiment of the present disclosure.

As shown in FIGS. 1 and 2, the body part 110 of the light guide plate 11 may have a plate-like structure as a whole, i.e., the body part 110 may have equal thickness at all points. The bending part 111 of the light guide plate 11 may be bent uniformly, i.e., the bending parts 111 may have equal or substantially equal thickness at all points.

The thickness of the folding part 111 may be equal to the thickness of the body part 110, i.e., the thickness of the entire light guide plate 11 is uniformly arranged. This design ensures the structural strength of the light guide plate 11 and the light guide effect of the light guide plate 11.

It should be noted that the light guide plate 11 of the embodiment of the present disclosure can be formed by integral injection molding, so that the difficulty of manufacturing the light guide plate 11 can be reduced, and the structural strength of the light guide plate 11 as a whole can be ensured.

By way of example, the bending part 111 of the embodiment of the present disclosure may have an arc shape in its entirety to ensure the bending strength of the bending part 111.

For example, the scratch-proof protective layer 15 may be provided on an outer surface of the end of the backplate 10 close to the bending part 111 to avoid the case that the end portion of the backplate 10 scratches the light guide plate 11 during the assembly process, so as to ensure the light guiding performance of the light guide plate 11.

It should be understood that in order to prevent the backplate 10 from scratching the light guide plate 11, the scratch-proof protective layer 15 is not limited to being provided at the end portion of the backplate 10 as mentioned above, and the scratch-proof protective layer 15 may be provided at the inner surface of the bending part 111, or the end portion of the backplate 10 close to the bending part 111 may be provided in an arc, or any two or three of these arrangements are possible, which depends on individual situations.

In this embodiment, a first reflective layer 16 may be provided between the body part 110 and the backplate 10, and the first reflective layer 16 may reflect light in the body part 110 so that more light is emitted from the out-light surface of the body part 110 and light loss is reduced.

By way of example, the first reflective layer 16 may be attached to the surface of the body part 110 facing the backplate 10 by coating, electroplating or the like, but is not limited thereto, and may also be attached to the front side of the backplate 10. Alternatively, the first reflective layer 16 may be formed independently of the backplate 10 and the light guide plate 11 in a reflective structure and sandwiched between the body part 110 of the light guide plate 11 and the backplate 10, etc.

In order to reduce light loss, a second reflective layer 17 may also be provided in a region opposite to the light source 12 on the back side of the backplate 10. The orthographic projection of the light source 12 on the backplate 10 can be located in the second reflective layer 17, so that the light irradiated on the backplate 10 is reflected, and at least part of the reflected light may enter the light guide plate 11 through the in-light surface (i.e., the second end face 111$b$) of the bending part 111 to exit through the light guide plate 11. This design improves the light utilization.

For example, the second reflective layer 17 may be attached to the back side of the backplate 10 by coating, electroplating or the like. Alternatively, the second reflective layer 17 may be formed independently of the backplate 10 in a reflective structure and adhered to the back side of the backplate 10, or the back surface of the backplate 10 may be directly treated to form a reflective layer etc., which depends on the circumstances.

Further, a third reflective layer 18 may be provided on the outer surface of the bending part 111 (i.e., the surface away from the backplate 10) to reduce the light loss. It should be understood that the reflective layer may not be provided only on the outer surface of the bending part 111, but may be provided on all but the first end face 111$a$ and the second end face 111$b$ of the bending part 111 to improve the light utilization.

For example, the third reflective layer 18 may be attached to the outer surface of the bending part 111 by coating or electroplating. Alternatively, the third reflective layer 18 may be formed independently of the light guide plate 11 in a light emitting structure and attached to the outer surface of the bending part 111, which depends on the circumstances.

It should be noted that the first reflective layer 16, the second reflective layer 17, and the third reflective layer 18 mentioned above are not limited to being present in the backlight module at the same time, but only one of the first reflective layer 16, the second reflective layer 17, and the third reflective layer 18 may be present in the backlight module, or any two combination of the first reflective layer 16, the second reflective layer 17, and the third reflective layer 18 may be present in the backlight module, or the like, which depends on the circumstances.

In this embodiment, the light source 12 can be integrated on a printed circuit board (PCBA) 19 bound to the display panel 13. Such a design does not require an additional connection line to connect the light source 12 and the printed circuit board 19, and when the display panel 13 is installed, the light source 12 can be installed integrally, which simplifies the installation process and improves the assembly efficiency and accuracy.

Specifically, the printed circuit board 19 may be located on the back side of the backplane 10, and may be bound to the binding area 131$a$ of the display panel 13 through a chip on film (COF) 20 for providing a display signal to the display panel 13.

It should be understood that the printed circuit board 19 may also be connected to other main control boards or power supply boards to enable controlled input of signals and currents to the display panel 13 and the light source 12, so as to control product display.

In this embodiment, the back side of the backplate 10 may be provided with a securing column 21. For example, the securing column 21 and the backplate 10 may have an integrated structure, but not limited to this, the securing column 21 may also be connected to the back side of the backplate 10 by welding, riveting or the like. The printed circuit board 19 can be connected to the securing column 21 to achieve fixing between the printed circuit board 19 and the backplate 10, thereby ensuring the assembly stability between the printed circuit board 19 and the backplate 10.

For example, a height of the securing column 21 may be greater than a thickness of the light source 12 to leave a space between the light source 12 and the back side of the backplate 10 after the printed circuit board 19 is connected to the securing column 21, which is beneficial to heat dissipation on the one hand, and can avoid the situation that the backplate 10 scratches the light source 12 on the other hand.

In the embodiment of the present disclosure, the backlight module may also include a middle bezel 22 and an optical control element 23.

The middle bezel 22 may have a receiving slot 220 receiving the bending part 111 for supporting the light guide plate 11, and a supporting pad 24 may be provided on the middle bezel 22 for supporting the display panel 13, that is, the middle bezel 22 may also function as supporting the display panel 13.

The optical control element 23 may be provided on the side of the body part 110 facing the display panel 13, and the optical control element 23 may adjust the light emitted from the out-light surface of the body part 110 to reduce the light loss, allow the light entering the display panel 13 more uniform, and improve the display effect.

For example, the optical control element 23 may include but is not limited to an increment film, a diffusion sheet or the like, which depends on the circumstances.

Embodiment 2

Figure 3:
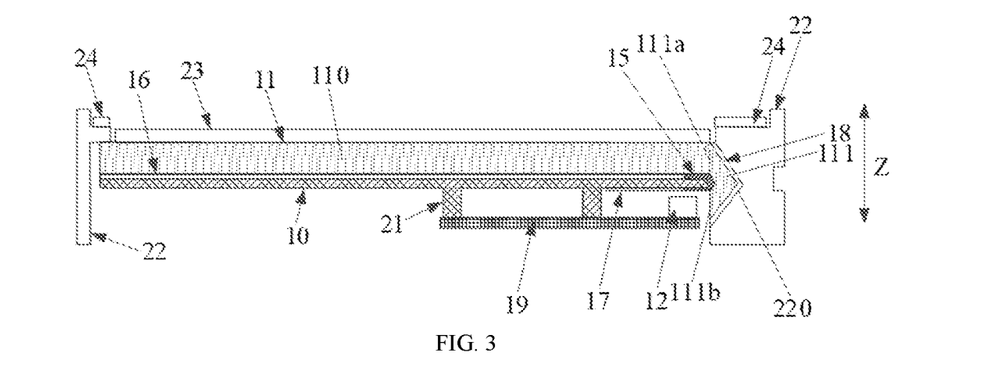
FIG. 3 shows a structural schematic view of the backlight module and the printed circuit board assembled according to a second embodiment of the present disclosure.

The main difference between this embodiment and Embodiment 1 is that: in the backlight module of embodiment 2, as shown in FIG. 3, the folding part 111 of the light guide plate 11 may have equal or substantially equal thickness at all points, and the thickness of the folding part 111 may be smaller than the thickness of the body part 110. This design can reduce the limitation of the thickness of the folding part 111 of the light guide plate 11 on the thinning of the bezel, that is, a narrow bezel design or bezel-less design can be achieved.

It should be understood that the backlight module of Embodiment 2 and the backlight module of Embodiment 1 of the present disclosure may be identical in design except for the aforementioned differences but are not limited thereto, and may be different depending on the circumstances.

For example, the bending part 111 of the embodiment of the present disclosure is not limited to being in an arc shape as a whole, but may be triangular or approximately triangular or other polygonal depending on the circumstances.

The ratio of the thickness of the folding part 111 to the thickness of the body part 110 may be greater than or equal to $\frac{1}{3}$. This design reduces the restriction of the thickness of the folding part 111 of the light guide plate 11 on the thinning of the bezel, and at the same time, it can avoid the situation that the thickness of the folding part 111 is too small with respect to the body part 110, resulting in poor light guide effect.

Embodiment 3

Figure 4:
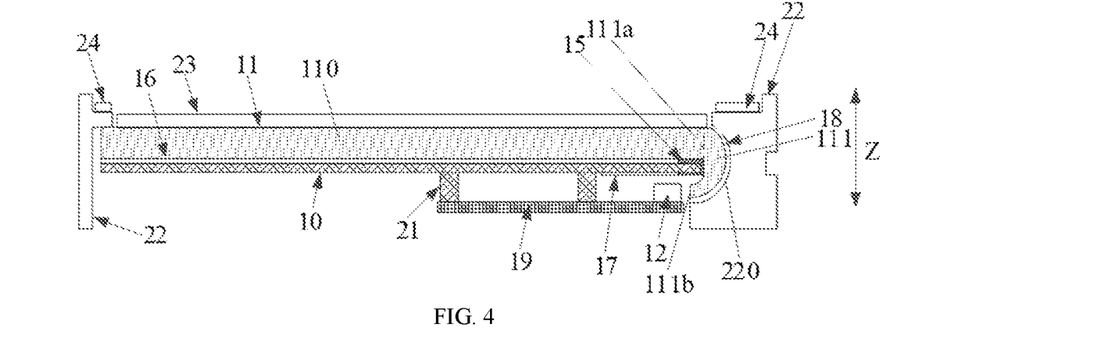
FIG. 4 shows a structural schematic view of the backlight module and the printed circuit board assembled according to a third embodiment of the present disclosure.

The main difference between this embodiment and Embodiments 1 and 2 is that: in the backlight module of the third embodiment, as shown in FIG. 4, in a direction from the first end face 111a to the second end face 111b of the bending part 111 of the light guide plate 11, the thickness of the bending part 111 is gradually reduced, and the maximum thickness of the bending part 111 is less than or equal to the thickness of the body part 110. This design reduces the restriction of the thickness of the bending part 111 of the light guide plate 11 on the thinning of the bezel, and at the same time ensures the structural strength of the junction of the bending part 111 and the body part 110, thereby ensuring the structural stability of the light guide plate 11.

It should be understood that the backlight module of Embodiment 3 and the backlight module of Embodiments 1 and 2 of the present disclosure may be identical in design except for the aforementioned differences but are not limited thereto, and may be different depending on the circumstances.

For example, the bending part 111 of the embodiment of the present disclosure may have an arc shape or other polygonal shape as a whole, which depends on the circumstances.

The ratio of the minimum thickness of the folding part 111 (that is, the thickness of the second end face 111b) to the thickness of the body part 110 may be greater than or equal to ⅓. This design reduces the restriction of the thickness of the folding part 111 of the light guide plate 11 on the thinning of the bezel, and at the same time, and can also avoid the situation that the area at the second end face 111b is too small to cause poor light guide effect.

It should be noted that the thickness of the folding part 111 is not limited to gradually decreasing, and the thickness of the folding part 111 may be provided unevenly, including a region with a large thickness or a region with a small thickness, and the ratio between the region with the smallest thickness and the region with the largest thickness does not exceed ⅓.

Figure 5:
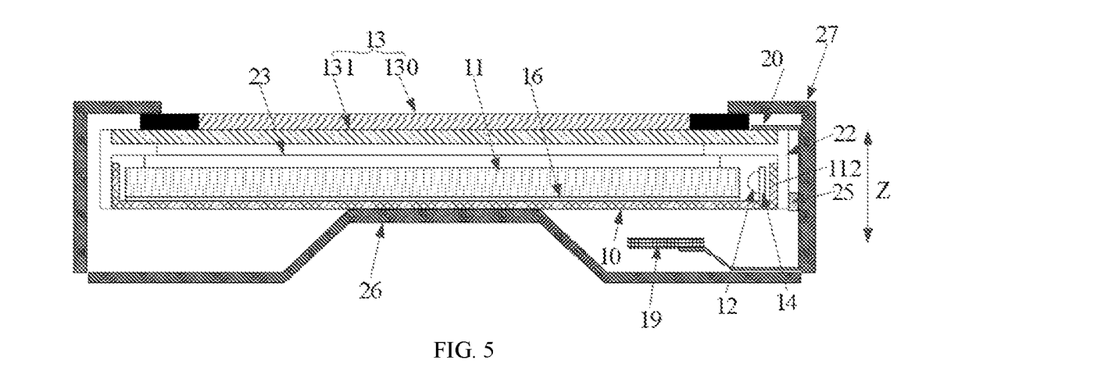
FIG. 5 shows a structural schematic view of a liquid crystal display in the prior art.

The present disclosure also provides a liquid crystal display, as shown in FIGS. 5 and 6, which may include a display panel 13 and a backlight module as mentioned in any of the preceding embodiments.

The backlight module may include a backplate 10, a light guide plate 11 and a light source 12. The light guide plate 11 may include a body part 110 and a bending part 111. The body part 110 may be located between the backplate 10 and the display panel 13, and the surface of the body part 110 facing the display panel 13 is an out-light surface. The bending part 111 has a first end face 111a and a second end face 111b arranged in a bending extension direction thereof, the first end face 111a is connected to the body part 110, the second end face 111b is located on the side of the backplate 10 facing away from the display panel 13, and the second end face 111b is an out-light surface. The light source 12 is located on the side of the backplate 10 facing away from the display panel 13 and is disposed opposite the second end face 111b.

The liquid crystal display further includes a printed circuit board 19, and a securing column 21 is provided on a side of the backplate 10 facing away from the body part 110. The printed circuit board 19 is located on the side of the backplate 10 facing away from the body part 110 and is connected to the securing column 21. The side of the printed circuit board 19 facing the backplate 10 is integrated with the light source 12.

It should be understood that the specific configuration of the backlight module and the relationship between the backlight module and the printed circuit board 19 of the embodiment of the present disclosure can be described with reference to any of the foregoing embodiments and will not be repeated here.

Further, it should be noted that the liquid crystal display of the present disclosure is not limited to the aforementioned backlight module, printed circuit board 19, display panel 13 and the like, but may also include a back cover 26, a front bezel 27 and the like.

The specific arrangement of the display panel 13 in different embodiments of the present disclosure will be described in detail below with reference to the accompanying drawings.

Embodiment 4

As shown in FIG. 6, the display panel 13 may include a color filter substrate 130 and an array substrate 131 arranged by cell assembling. It should be understood that when the display panel 13 is a liquid crystal display, the display panel 13 may also include liquid crystal molecules (not shown) located between the color filter substrate 130 and the array substrate 131, that is, the display panel 13 may be a liquid crystal cell.

As shown in FIG. 6, the array substrate 131 may have a binding area 131a and a cell assembling area 131b. The binding area 131a of the array substrate 131 can be bound to the printed circuit board 19 through the chip on film 20, a driver chip (IC) 25 is provided on the side of the chip on film 20 close to the middle bezel 22. The middle bezel 22 has a slot body accommodating the driver chip 25, which supports and limits the positions of the driver chip 25 and the chip on film 20, and at the same time, it can achieve the purpose of rationally utilizing the space in each place of the liquid crystal display, thereby achieving a narrow bezel or a bezel-less design. It should be noted that the binding position of the binding area 131a of the array substrate 131 is close to the color filter substrate 130.

The cell assembling area 131b may be an area disposed opposite the color filter substrate 130. Specifically, the cell assembling area 131b may include a display region and a sealing region surrounding the display region. The sealing region may be provided with a sealant (not shown) between the color filter substrate 130 and the array substrate 131, and the liquid crystal molecules are located in the display region surrounded by the sealant.

In embodiments of the present disclosure, as shown in 6, the array substrate 131 may be located on a side of the color filter substrate 130 facing the backlight module. Specifically, the array substrate 131 may be positioned on the side of the color filter substrate 130 facing the light guide plate 11, so that the binding area 131a of the array substrate 131 and the chip on film 20 are conveniently bound, and the failure of the binding area 131a of the array substrate 131 and the chip on film 20 due to the influence of gravity can be avoided, that is, the binding stability of the array substrate 131 and the chip on film 20 is improved.

It should be understood that the display panel 13 of the embodiment of the present disclosure may include a lower polarizer (not shown) located on the side of the array substrate 131 facing away from the color filter substrate 130 and an upper polarizer (not shown) located on the side of the color filter substrate 130 facing away from the array substrate 131 in addition to the array substrate 131 and the color filter substrate 130 mentioned above.

Further, it should be understood that the display panel 13 in the embodiment 4 may be combined with the backlight module of any of the foregoing embodiments 1 to 3.

Embodiment 5

The main difference between this embodiment and embodiment 4 is that: in the liquid crystal display in embodiment 5, as shown in FIG. 7, the color filter substrate 130 may be positioned on the side of the array substrate 131 close to the light guide plate 11, so that the binding position of the binding area 131a of the array substrate 131 is directed downward. As the binding position is achieved at the chip on film 20, the chip on film 20 may be shielded by the binding area 131a of the array substrate 131, which can further realize the very narrow bezel or bezel-less design.

It should be understood that the liquid crystal display of embodiment 5 and the liquid crystal display of embodiment 4 of the present disclosure may be identical in design except for the aforementioned differences but are not limited thereto and may be different depending on the circumstances.

Further, it should be understood that the display panel 13 in embodiment 5 may be combined with the backlight module of any of the foregoing embodiments 1 to 3.

Figure 8:
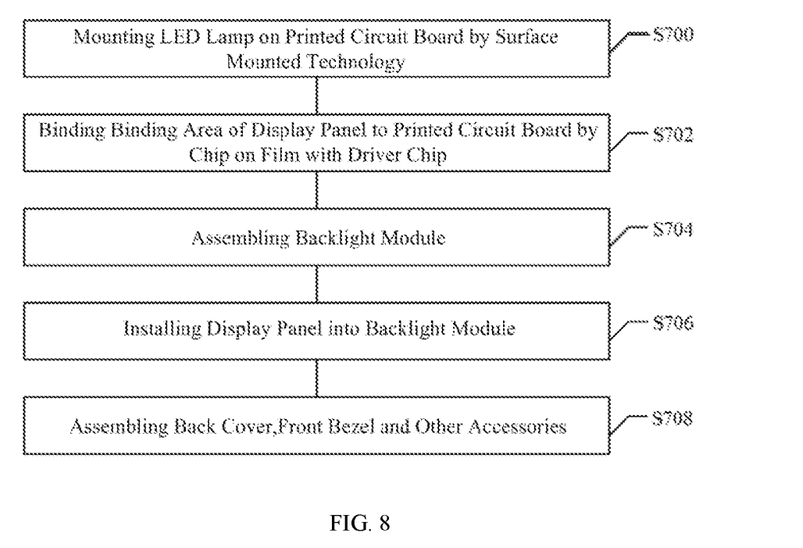
FIG. 8 shows a flowchart of a production assembly method of the liquid crystal display shown in the embodiments of the present disclosure.

The present disclosure also provides a production and assembly method of the liquid crystal display described in any of the foregoing embodiments, as shown in FIG. 8, which specifically includes steps S700, S702, S704, S706 and S708.

Figure 9:
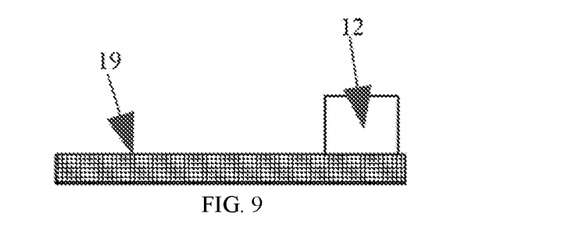
FIG. 9 shows a structural schematic view of the liquid crystal display in a state of completing step S700 in the production assembly method shown in the embodiments of the present disclosure.

In step S700, an LED lamp is patched onto the printed circuit board 19, as shown in FIG. 9. FIG. 9 shows a structural schematic view of the liquid crystal display in a state of completing step S700 in the production assembly method shown in the embodiments of the present disclosure.

Figure 10:
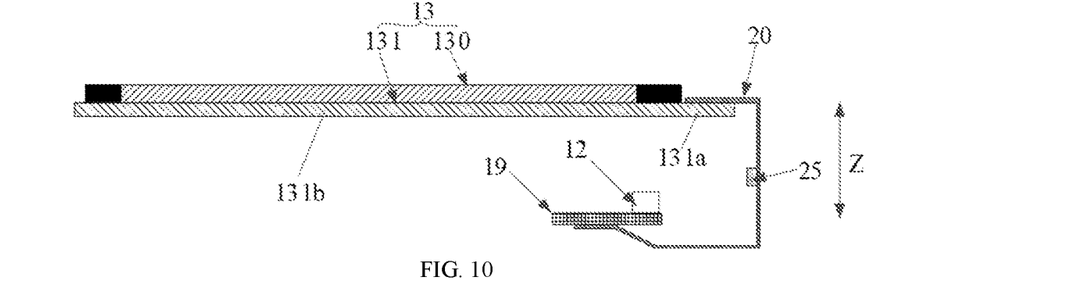
FIG. 10 shows a structural schematic view of the liquid crystal display in a state of completing step S702 in the production assembly method shown in the embodiments of the present disclosure.

In step S702, the binding area 131a of the display panel 13 is bound to the printed circuit board 19 by the chip on film 20 with the driver chip 25, as shown in FIG. 10. FIG. 10 shows a structural schematic view of the liquid crystal display in a state of completing step S702 in the production assembly method shown in the embodiments of the present disclosure. It should be noted that step S702 may be completed following step S700 but is not limited thereto, and may be completed prior to step S700 or the like, which depends on the circumstances.

Figure 11:
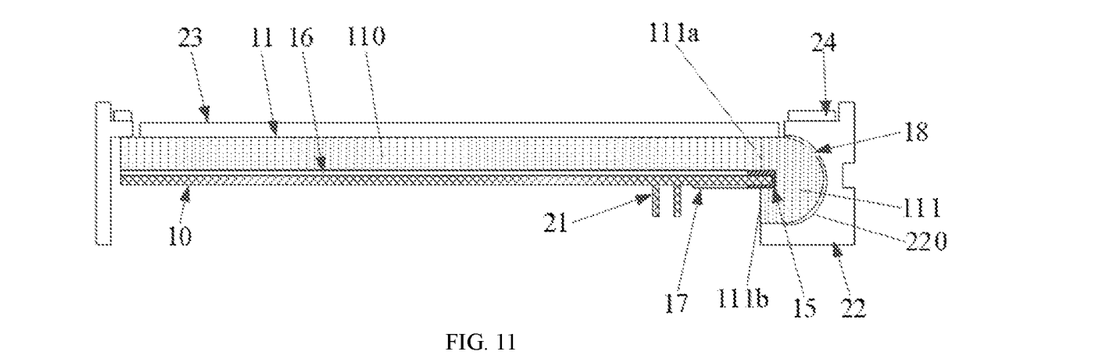
FIG. 11 shows a structural schematic view of the liquid crystal display in a state of completing step S704 in the production assembly method shown in the embodiments of the present disclosure.

In step S704, the backlight module is assembled, that is, the optical control element 23, the light guide plate 11, the backplate 10, the middle bezel 22 and the like are assembled together, as shown in FIG. 11. FIG. 11 shows a structural schematic view of the liquid crystal display in a state of completing step S704 in the production assembly method shown in the embodiments of the present disclosure. It should be noted that step S704 may be performed simultaneously with step S702 but is not limited thereto, and step S704 and step S702 may be performed successively, which depends on the circumstances.

Figure 12:
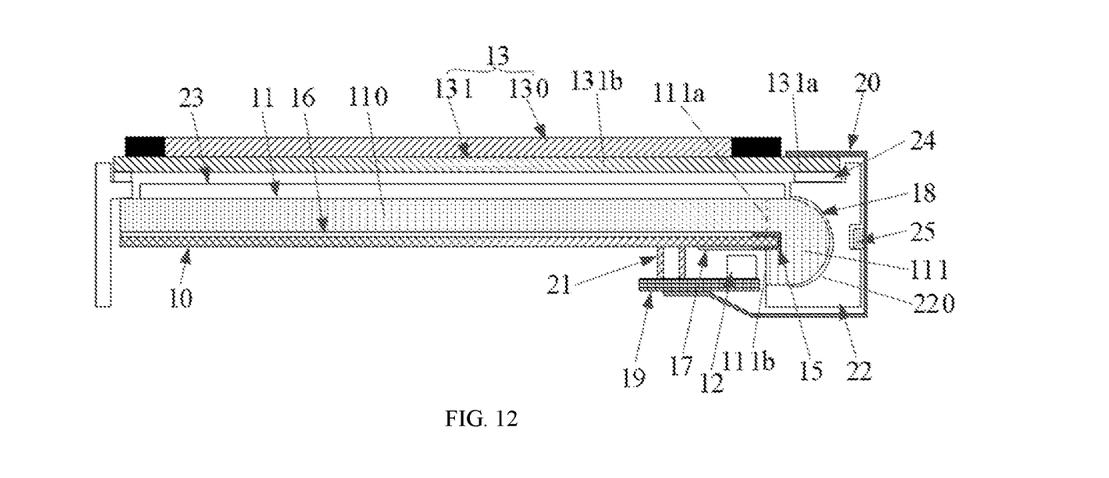
FIG. 12 shows a structural schematic view of the liquid crystal display in a state of completing step S706 in the production assembly method shown in the embodiments of the present disclosure.

In step S706, the display panel 13 is mounted into the backlight module, as shown in FIG. 12. FIG. 12 shows a structural schematic view of the liquid crystal display in a state of completing step S706 in the production assembly method shown in the embodiments of the present disclosure. That is, the backlight module of step S704 and the display panel 13 of step S702 are assembled together.

In step S708, the back cover 26, the front bezel 27 and other accessories are assembled to complete the assembly, as shown in FIG. 6. FIG. 6 shows a structural schematic view of the liquid crystal display in a state of completing step S708 in the production assembly method shown in the embodiments of the present disclosure, and FIG. 6 shows a structural schematic view of the liquid crystal display according to the fourth embodiment of the present disclosure.

It should be understood that the production and assembly method of the liquid crystal display of the present disclosure is not limited to the aforementioned assembly method, and other assembly methods may be adopted as long as the fast and stable installation of the liquid crystal display can be achieved.

According to the present disclosure, the light guide plate is provided with a bend-shaped structure, so that the in-light surface of the light guide plate is bent to the back side of the backplate (namely, a side of the backplate facing away from the display panel), the light source is opposite to the in-light surface of the light guide plate, the light emitted from the light source can enter the light guide plate through the in-light surface, and then emitted out from the out-light surface positioned at a front side of the backplate (namely, the side of the backplate facing the display panel) in the light guide plate. Compared with the side-lit backlight, this design can avoid the constraints of light source thickness, heat sink thickness and backplate folding thickness on the bezel design, thereby achieving narrower bezel design or bezel-less design.

In addition, by arranging the in-light surfaces of the light guide plate and the light source on the back side of the backplate, while achieving the narrower bezel design or bezel-less design, the space on the back side of the backplate is relatively large, the spacing between the light source and the in-light surface of the light guide plate can be appropriately increased, thereby avoiding the damage to the light source when the light guide plate is heated and expanded, and prolonging the service life of the product.

Other features and advantages of the present disclosure will become apparent from the following detailed description or will be acquired in part through the practice of the present disclosure.

In the description of this description, illustrations of the reference terms "some embodiments", "exemplified", etc. mean that specific features, structures, materials, or features described in connection with the embodiment or example are included in at least one embodiment or example of the present disclosure. In the description, the schematic formulation of the above terms need not be directed to the same embodiments or examples. Further, the specific features, structures, materials or features described may be combined in a suitable manner in any one or more embodiments or examples. Further, without contradicting one another, those skilled in the art may combine and incorporate different embodiments or examples described in the description and features of different embodiments or examples.

Although the embodiments of the present disclosure have been shown and described above, understandably, the above-described embodiments are exemplary and cannot be construed as limiting the present disclosure. Those of ordinary skill in the art may make changes, modifications, substitutions and modifications to the above-described embodiments within the scope of the present disclosure. Therefore, any changes or modifications made in accordance with the claims and descriptions of the present disclosure should fall within the scope of the present disclosure.

What is claimed is:

1. A backlight module comprising:
a backplate;
a light guide plate comprising:
a body part disposed at a side of the backplate facing a display panel, a surface of the body part facing away from the backplate being an out-light surface; and
a bending part having a first end face and a second end face arranged in a bending extension direction thereof, the first end face being connected to the body part, the second end face being located on a side of the backplate facing away from the display panel, and the second end face being an in-light surface; and
a light source located on the side of the backplate facing away from the display panel and arranged opposite the second end face;
wherein a first reflective layer is disposed between the body part and the backplate;
wherein a second reflective layer is disposed in an area, being opposite to the light source, on the side of the backplate facing away from the body part; and
wherein a third reflective layer is provided at an outer surface of the bending part.

2. The backlight module according to claim 1, wherein the body part has a plate-like structure, wherein one of the following:
the bending part having an equal thickness, and the thickness of the bending part being equal to a thickness of the body part;
the bending part having an equal thickness, and the thickness of the bending part being less than a thickness of the body part; or
in a direction from the first end face to the second end face, a thickness of the bending part gradually decreases, and a maximum thickness of the bending part is less than or equal to a thickness of the body part.

3. The backlight module according to claim 2, wherein a ratio of a minimum thickness of the bending part to a thickness of the body part is greater than or equal to ⅓.

4. The backlight module according to claim 1, wherein the bending part has an arc shape or a polygon shape.

5. The backlight module according to claim 1, wherein one or more of the following:
an end of the backplate close to the bending part is provided in an arc;
an outer surface of an end of the backplate close to the bending part is provided with a scratch-proof protective layer; and
an inner surface of the bending part is provided with a scratch-proof protective layer.

6. The backlight module according to claim 1, wherein the light source is integrated on a side of a printed circuit board facing the backplate, and the printed circuit board being bound and connected to a binding area of the display panel through a chip on film.

7. The backlight module according to claim 6, wherein a securing column is provided on a side of the backplate facing away from the body part, and the printed circuit board is connected to the securing column.

8. The backlight module according to claim 7, wherein a height of the securing column is greater than a thickness of the light source.

9. A liquid crystal display comprising:
a display panel and a backlight module comprising a backplate, a light guide plate and a light source;
wherein the light guide plate comprises a body part disposed between the backplate and the display panel, a surface of the body part facing the display panel being an out-light surface, and a bending part having a first end face and a second end face arranged in a bending extension direction thereof, the first end face being connected to the body part, the second end face being located on a side of the backplate facing away from the display panel, and the second end face being an in-light surface; and
wherein the light source is located on the side of the backplate facing away from the display panel and arranged opposite the second end face;
wherein a first reflective layer is disposed between the body part and the backplate;
wherein a second reflective layer is disposed in an area, being opposite to the light source, on the side of the backplate facing away from the body part; and
wherein a third reflective layer is provided at an outer surface of the bending part.

10. The liquid crystal display according to claim 9, wherein the liquid crystal display further comprises a printed circuit board, a side of the backplate facing away from the body part being provided with a securing column, the printed circuit board being located on the side of the backplate facing away from the body part and connected to the securing column, a side of the printed circuit board facing the backplate being integrated with the light source;
wherein the display panel comprises a color filter substrate and an array substrate arranged by cell assembling, the array substrate being provided with a binding area and a cell assembling area, and the binding area of the array substrate is bound and connected to the printed circuit board through a chip on film;
wherein one of the following:
the color filter substrate is located on a side of the array substrate facing away from the light guide plate and is arranged opposite the cell assembling area; or
the color filter substrate is located on a side of the array substrate close to the light guide plate and is arranged opposite the cell assembling area.

11. The liquid crystal display according to claim 9, wherein the body part has a plate-like structure, wherein one of the following:
the bending part having an equal thickness, and the thickness of the bending part being equal to a thickness of the body part;
the bending part having an equal thickness, and the thickness of the bending part being less than a thickness of the body part; or
in a direction from the first end face to the second end face, a thickness of the bending part gradually decreases, and a maximum thickness of the bending part is less than or equal to a thickness of the body part.

12. The liquid crystal display according to claim 11, wherein a ratio of a minimum thickness of the bending part to a thickness of the body part is greater than or equal to ⅓.

13. The liquid crystal display according to claim 9, wherein the bending part has an arc shape or a polygon shape.

14. The liquid crystal display according to claim 9, wherein one or more of the following:
an end of the backplate close to the bending part is provided in an arc;

an outer surface of an end of the backplate close to the bending part is provided with a scratch-proof protective layer; and an inner surface of the bending part is provided with a scratch-proof protective layer.

15. The liquid crystal display according to claim 9, wherein the light source is integrated on a side of a printed circuit board facing the backplate, and the printed circuit board being bound and connected to a binding area of the display panel through a chip on film.

16. The liquid crystal display according to claim 15, wherein a securing column is provided on a side of the backplate facing away from the body part, and the printed circuit board is connected to the securing column.

17. The liquid crystal display according to claim 16, wherein a height of the securing column is greater than a thickness of the light source.

18. The liquid crystal display according to claim 9, wherein the backlight module further comprising:

a middle bezel having a receiving slot receiving the bending part for supporting the light guide plate, a supporting pad being provided on the middle bezel for supporting the display panel; and an optical control element provided on the side of the body part facing the display panel, and adjusting the light emitted from the out-light surface of the body part to reduce light loss.

\* \* \* \* \*